(12) United States Patent
Li et al.

(10) Patent No.: US 12,584,508 B2
(45) Date of Patent: Mar. 24, 2026

(54) INSERTING ROD TYPE QUICK CONNECTION DEVICE

(71) Applicants: ZHEJIANG UNIVERSITY, Hangzhou (CN); THE ARCHITECTURAL DESIGN & RESEARCH INSTITUTE OF ZHEJIANG UNIVERSITY CO., LTD., Hangzhou (CN)

(72) Inventors: Benyue Li, Hangzhou (CN); Quanbiao Xu, Hangzhou (CN); Shunfeng Gong, Hangzhou (CN); Gang Chen, Hangzhou (CN)

(73) Assignees: ZHEJIANG UNIVERSITY, Hangzhou (CN); THE ARCHITECTURAL DESIGN & RESEARCH INSTITUTE OF ZHEJIANG UNIVERSITY CO., LTD., Hangzhou (CN)

( * ) Notice: Subject to any disclaimer, the term of this patent is extended or adjusted under 35 U.S.C. 154(b) by 321 days.

(21) Appl. No.: 18/108,595

(22) Filed: Feb. 11, 2023

(65) Prior Publication Data

US 2023/0258208 A1 Aug. 17, 2023

(30) Foreign Application Priority Data

Feb. 16, 2022 (CN) .......................... 202210141363.1

(51) Int. Cl.
*F16B 7/04* (2006.01)
*E04C 5/16* (2006.01)

(52) U.S. Cl.
CPC ........... *F16B 7/0413* (2013.01); *E04C 5/165* (2013.01); *Y10T 403/57* (2015.01)

(58) Field of Classification Search
CPC .......... E04C 5/162; E04C 5/163; E04C 5/165; E02D 5/526; F16B 7/0413; F16B 7/042;
(Continued)

(56) References Cited

U.S. PATENT DOCUMENTS 2,455,525 A * 12/1948 Schulz ................... F16M 11/32
248/188.5
2,751,238 A * 6/1956 Vegren .................... F16B 21/18
411/929.1
(Continued)

FOREIGN PATENT DOCUMENTS

CN 108193668 A * 6/2018 ............... E02D 5/28
CN 106195494 A * 10/2019 .............. F16L 37/08
(Continued)

OTHER PUBLICATIONS

Search Report, issued in CN202210141363.1 (priority application), by CNIPA, dated Feb. 16, 2022.
(Continued)

*Primary Examiner* — Amber R Anderson
*Assistant Examiner* — Kevin J Baynes
(74) *Attorney, Agent, or Firm* — Zhu Lehnhoff LLP

(57) ABSTRACT

An inserting rod type quick connection device comprises an upper sleeve and a lower sleeve with an opening at one end. The upper sleeve is provided with an inserting rod extending out of the opening, the open end of the lower sleeve is provided with a detachable extrusion sleeve, and the extrusion sleeve is provided with a plurality of extrusion gaskets. The plurality of extrusion gaskets are fitted and connected to form a hollow conical cylinder structure, the outer conical surface of the conical cylinder has a spiral groove, and a conical spring is sleeved in the spiral groove, the outer diameter and the inner diameter of the conical cylinder gradually decrease from the lower end surface to the upper end surface, wherein the inserting rod is conical, and the taper of the inserting rod is the same as that of the inner conical surface of the conical cylinder.

20 Claims, 5 Drawing Sheets

(58) Field of Classification Search

CPC ...... F16B 7/0426; F16B 7/1481; F16B 7/149; F16B 7/16; Y10T 403/30; Y10T 403/40; Y10T 403/50; Y10T 403/57; Y10T 403/5753; Y10T 403/5793; Y10T 403/60; Y10T 403/602

See application file for complete search history.

(56) References Cited

U.S. PATENT DOCUMENTS

| | | | | | |
|---|---|---|---|---|---|
| 3,884,508 | A * | 5/1975 | Jones | ................. | F16L 37/0844 |
| | | | | | 285/31 |
| 4,362,423 | A * | 12/1982 | Miles | ..................... | E04C 5/163 |
| | | | | | 403/364 |
| 6,065,263 | A * | 5/2000 | Taguchi | .................... | F16B 7/06 |
| | | | | | 52/583.1 |
| 6,151,850 | A * | 11/2000 | Sorkin | .................... | E04C 5/122 |
| | | | | | 52/223.13 |
| 6,908,121 | B2 * | 6/2005 | Hirth | .................... | E21B 17/043 |
| | | | | | 285/305 |
| 7,905,066 | B2 * | 3/2011 | Pryor | ...................... | E04B 1/26 |
| | | | | | 403/111 |
| 9,181,967 | B2 * | 11/2015 | Lim | ....................... | E04C 5/165 |
| 9,783,987 | B2 * | 10/2017 | Gan | ......................... | E02D 5/30 |
| 9,829,023 | B2 * | 11/2017 | McElrea | ............... | B63H 16/04 |
| 10,745,916 | B2 * | 8/2020 | Hayes | ..................... | E04C 5/161 |
| 10,760,272 | B2 * | 9/2020 | Lee | ........................ | E04C 5/162 |
| 11,028,588 | B2 * | 6/2021 | Lee | ....................... | F16B 7/0406 |
| 11,619,048 | B1 * | 4/2023 | Lee | ....................... | F16B 7/0406 |
| | | | | | 52/848 |
| 12,085,120 | B2 * | 9/2024 | Cha | ......................... | E04C 5/165 |
| 12,234,647 | B2 * | 2/2025 | Bae | ......................... | F16B 7/06 |

| | | | | |
|---|---|---|---|---|
| 2005/0097843 | A1 * | 5/2005 | Giesel | ....................... E04C 5/08 |
| | | | | 52/223.1 |
| 2010/0303540 | A1 * | 12/2010 | Kim | ........................ E04C 5/165 |
| | | | | 403/305 |
| 2013/0230350 | A1 * | 9/2013 | Kim | ........................ E04C 5/166 |
| | | | | 403/327 |
| 2014/0147198 | A1 * | 5/2014 | Kim | ........................ E04C 5/165 |
| | | | | 403/361 |
| 2018/0335061 | A1 * | 11/2018 | Song | ....................... E04C 5/165 |
| 2019/0234443 | A1 * | 8/2019 | Man | ....................... F16B 7/182 |
| 2019/0345717 | A1 * | 11/2019 | Kang | .................... F16B 7/0426 |
| 2020/0157819 | A1 * | 5/2020 | Lee | .......................... E04C 5/165 |
| 2020/0340250 | A1 * | 10/2020 | Cross | ..................... E04C 5/165 |
| 2024/0125113 | A1 * | 4/2024 | Cartwright | ............. E04C 5/163 |
| 2024/0175266 | A1 * | 5/2024 | Zumbrunn-Maurer | ... E04C 2/40 |
| 2024/0410169 | A1 * | 12/2024 | Cartwright | ............. E04C 5/165 |

FOREIGN PATENT DOCUMENTS

| | | | | |
|---|---|---|---|---|
| CN | 210177820 | U | 3/2020 | |
| CN | 111827279 | A | 10/2020 | |
| CN | 112982388 | A * | 6/2021 | ............ E02D 5/526 |
| GB | 2163194 | A * | 2/1986 | ............. E04C 5/03 |
| KR | 20070054417 | A | 5/2007 | |
| WO | WO-2014069848 | A1 * | 5/2014 | ............ E04C 5/165 |
| WO | WO-2014123298 | A1 * | 8/2014 | ............ E04C 5/165 |
| WO | 2022021522 | A1 | 2/2022 | |

OTHER PUBLICATIONS

Examination Report, issued in CN202210141363.1 (priority application), by CNIPA, dated Feb. 16, 2022.

* cited by examiner

INSERTING ROD TYPE QUICK CONNECTION DEVICE

REFERENCE TO RELATED APPLICATIONS

The present application claims the priority of Chinese Patent Application No. 202210141363.1, field on Feb. 16, 2022, the disclosure of which is hereby incorporated by reference.

TECHNICAL FIELD

The invention relates to the technical field of the mechanical connection of steel bars, steel rods and steel strands, in particular to an inserting rod type quick connection device.

BACKGROUND

The mechanical connection of steel bars, steel rods and steel strands is a novel connection process, particularly a direct insertion type quick connection device, which has a wide range of applications, especially in the construction field, where the process can be frequently applied to the steel bar connection between the concrete precast members. A common method is to install the connection device which can be mutually matched and fixed at the end portion of two steel bars to be connected, and the two steel bars are connected and locked through the connection device after being close to each other.

A sawtooth-shaped pipe pile quick connector is disclosed in Chinese patent application of CN111827279A (publication number), in which the technological key feature comprises: the connector comprises an upper embedded part and a lower embedded part, and both the upper embedded part and the lower embedded part are open at one end, the upper embedded part is fixed with a bushing by screw thread, wherein the inner wall of the bushing is provided with a conical surface, the bushing is internally provided with a plurality of occlusal flaps, and the plurality of occluding flaps are connected to form a truncated cone when positioned at the lowest end of the bushing, the inner wall of the occlusal flaps are provided with a plurality of tooth grooves at equal intervals along the length direction, the lower embedded part is fixed with an insert through the thread, the insert is inserted and matched with the occlusal flaps, and the insert is provided with a plurality of embedded teeth fitted with the tooth grooves.

In the practical application of the above technical solution, on one aspect, the occlusal flaps lack axial direction restrictions and are not easy to assemble in the practical installation process, and on another aspect, the occlusal flaps are likely to generate axial dislocation so as to influence the occlusion effect. Therefore, a new solution is proposed to solve the problem, the connection structure is simpler and more effective, and axial displacement between the occlusal flaps is avoided.

SUMMARY

Aiming at the defects of the prior art, the invention provides an inserting rod type quick connection device with simple structure, easy installation and firmer in connection effect.

The invention is achieved through the following technical solutions:

An inserting rod type quick connection device, comprising an upper sleeve and a lower sleeve with an opening at one end, wherein the upper sleeve is internally provided with an inserting rod piece extending out of the opening, the open end of the lower sleeve is provided with a detachable extrusion sleeve, the extrusion sleeve is provided with a plurality of extrusion gaskets, wherein the plurality of extrusion gaskets are fitted and connected to form a hollow conical cylinder structure, the hollow conical cylinder comprises an outer conical surface, an inner conical surface, an upper end surface and a lower end surface, wherein the outer conical surface is fitted with an inner wall of the extrusion sleeve, the outer conical surface of the conical cylinder is provided with a spiral groove, the spiral groove is sleeved with a conical spring, and the outer diameter and the inner diameter of the conical cylinder are gradually decreased from the lower end surface to the upper end surface; and the inserting rod piece is integrally formed, and comprises an inserting rod and a fixing portion, the fixing portion is detachably connected with the inner wall of the upper sleeve, a root portion of the inserting rod is connected with the fixing portion, a head portion of the inserting rod extends out of the opening of the upper sleeve, wherein the inserting rod is conical, and the taper of the inserting rod is the same as that of the inner conical surface of the conical cylinder; and when the connection is completed, the head portion of the inserting rod passes through the conical cylinder, and the inner surfaces of the extrusion gaskets are fitted with the surface of the inserting rod.

By adopting the above-mentioned technical solution, when in practice, the upper sleeve and the lower sleeve are respectively connected with two ends of each steel bar of the concrete prefabricated member steel bar cage, the connection method of the upper and lower sleeve with the steel bars can adopt steel bar pier head connection/anchoring clamping connection/threaded connection which is common in the prior art, and then the concrete prefabricated member is prepared by pouring; and after the concrete prefabricated member is poured, the inserting rod is installed on the upper sleeve, the conical spring and the extrusion gaskets are installed in the extrusion sleeve, and then the extrusion sleeve is installed on the lower sleeve, and through the inserting connection of the inserting rod and the conical cylinder formed by a plurality of extrusion gaskets, the connection of the adjacent concrete prefabricated members is realized. The conical spring used in the invention is used for connecting the plurality of extrusion gaskets, on the one hand, it avoids the dispersion of the plurality of extrusion gaskets during the assembly process, and on the other hand, it limits the axial relative movement among the plurality of extrusion gaskets; and the provided spiral groove is used for installing the conical spring, so that the conical spring is prevented from leaving the extrusion gaskets.

As a further improvement of the invention, the inner diameter of the upper end surface of the hollow conical cylinder formed by the fitting connection of the plurality of extrusion gaskets is d, the maximum diameter of the inserting rod is larger than d, and the minimum diameter of the inserting rod is smaller than or equal to d.

As a further improvement of the invention, the inner wall of the extrusion sleeve is further provided with a dovetail groove, and the surface of the extrusion gasket is provided with a boss corresponding to the dovetail groove, so that the extrusion gaskets are slidable along the dovetail groove.

As a further improvement of the invention, the depth of the spiral groove is greater than or equal to the diameter of the cross section of the conical spring.

As a further improvement of the invention, the pitch of the spiral groove is equal to the pitch of the conical spring in a natural state.

As a further improvement of the invention, one end of the spiral groove passes through the upper end surface of the hollow conical cylinder formed by the fitting connection of the plurality of extrusion gaskets, the outer surface of the corresponding extrusion gasket at the other end of the spiral groove is provided with a welding fluid groove for fixing the end of the conical spring and the corresponding extrusion gasket by spot welding.

As a further improvement of the invention, the fixing portion is in threaded connection with the inner wall of the upper sleeve, and the extrusion sleeve is in threaded connection with the lower sleeve.

As a further improvement of the invention, the head portion of the inserting rod is hemispherical.

As a further improvement of the invention, a spring member is provided in the lower sleeve, the spring member comprises a fixing ring, a spring and a thrust ring, one end of the spring is connected with the fixing ring, the other end of the spring is connected with the thrust ring, the fixing ring is in threaded connection with the inner wall of the lower sleeve, and the thrust ring abuts against the end surface of the extrusion sleeve.

As a further improvement of the invention, the opening of the lower sleeve is provided with an embedded ring edge, and the opening of the upper sleeve is provided with an embedded ring groove for embedding the embedded ring edge.

Compared with the prior art, the invention has the beneficial effects that: the inserting rod type quick connection device has a simple structure and convenient installation, meanwhile, axial relative movement of the plurality of extrusion gaskets is avoided, the end of the conical spring and the corresponding extrusion gasket are fixed by spot welding of the welding fluid groove, and the spiral spring steel bar is effectively prevented from loosening from the plurality of extrusion gaskets.

DESCRIPTION OF THE DRAWINGS

The technical solutions of the embodiments of the present invention will be described clearly and completely with reference to the accompanying drawings, and it is to be understood that the described embodiments are only a part of the embodiments of the present invention, and not all of the embodiments. All other embodiments, which can be derived by a person skilled in the art from the embodiments of the present invention without any inventive step, are within the scope of the present invention.

DETAILED DESCRIPTION OF THE EMBODIMENT

Figure 1:
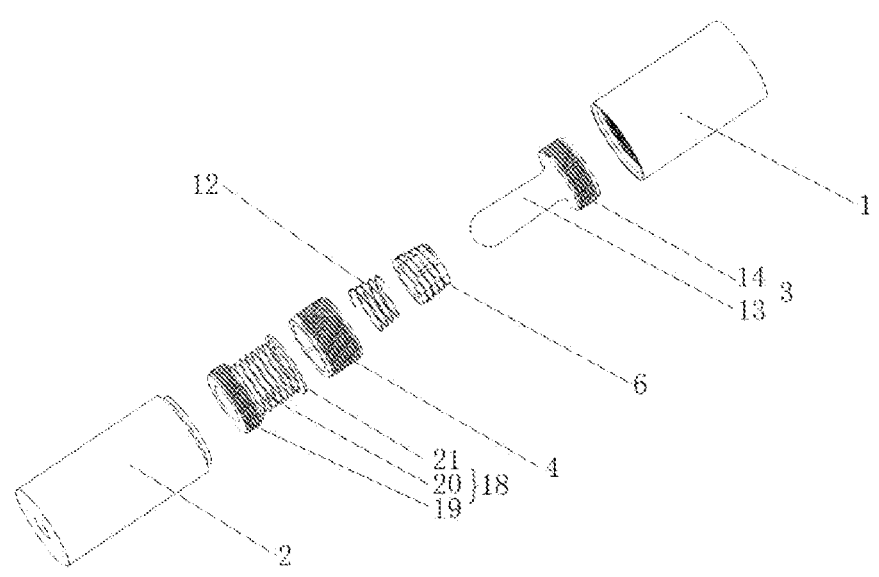
FIG. 1 is an explosive view of the inserting rod type quick connection device of the present invention.
Figure 2:
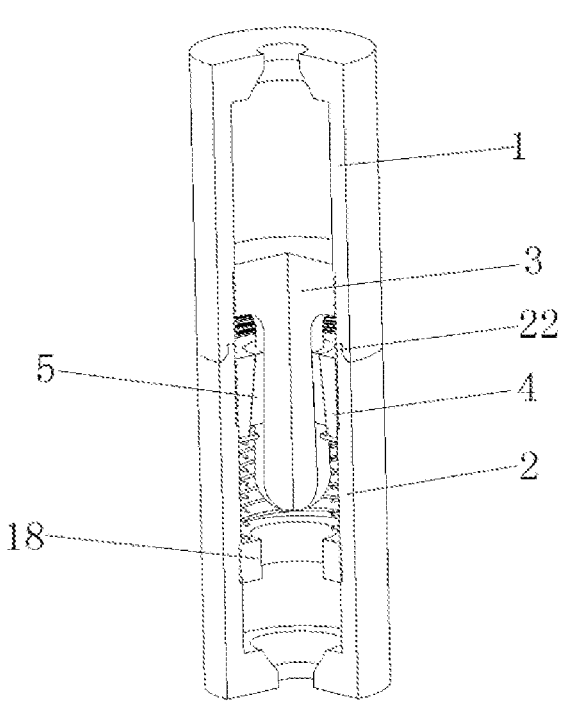
FIG. 2 is a partial cross-sectional view of the inserting rod type quick connection device of the present invention.
Figure 3:
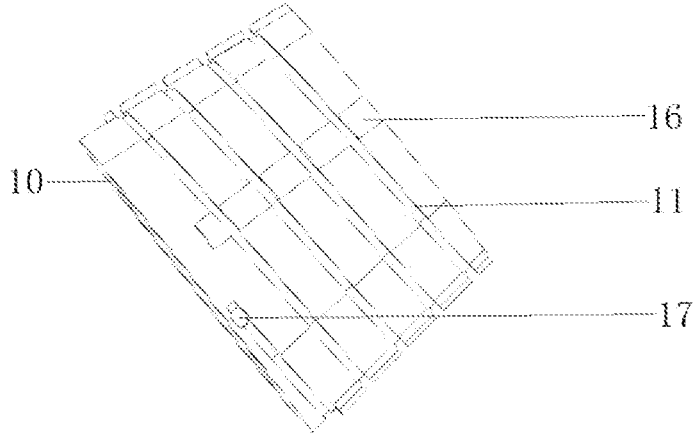
FIGS. 3 and 4 are schematic diagrams of a conical cylinder of the inserting rod type quick connection device of the present invention.
Figure 4:
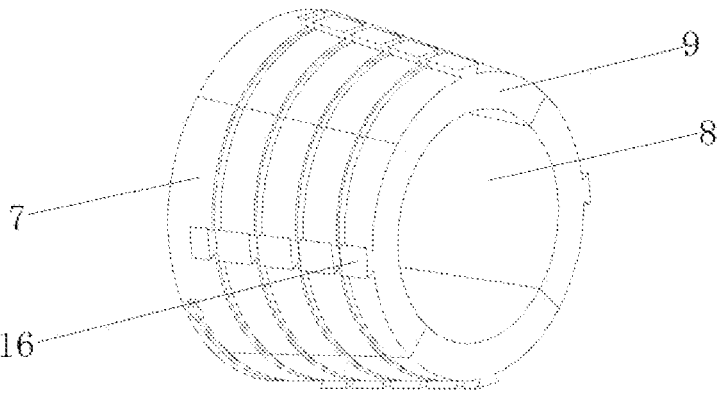
Figure 5:
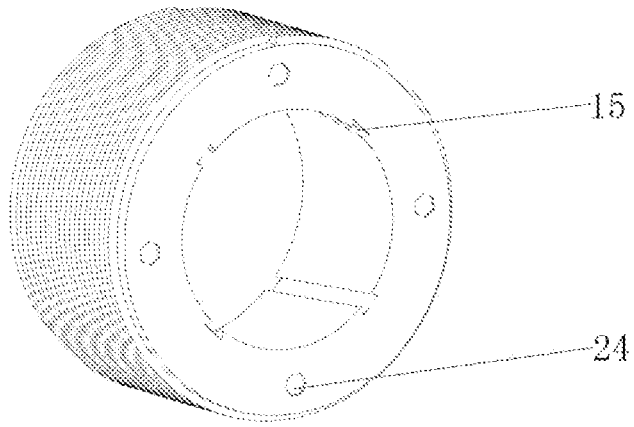
FIG. 5 is a schematic diagram of an extrusion sleeve of the inserting rod type quick connection device of the present invention.
Figure 6:
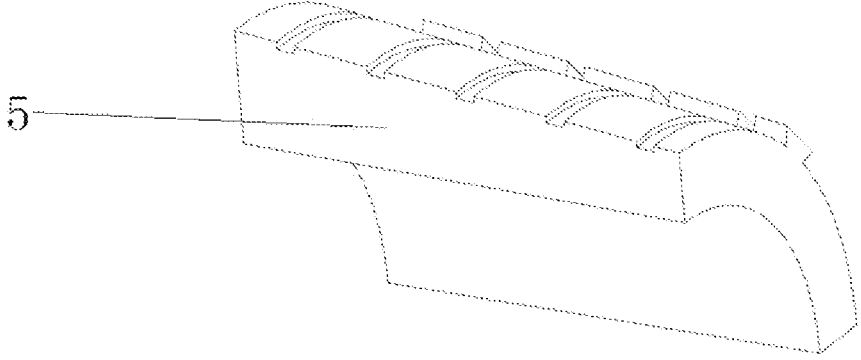
FIG. 6 is a schematic diagram of an extrusion gasket of the inserting rod type quick connection device of the present invention.
Figure 7:
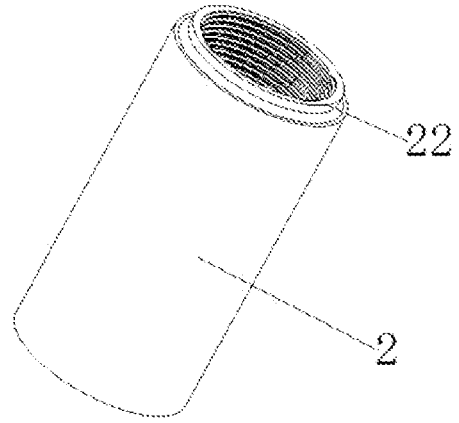
FIG. 7 is a schematic diagram of a lower sleeve of the inserting rod type quick connection device of the present invention.
Figure 8:
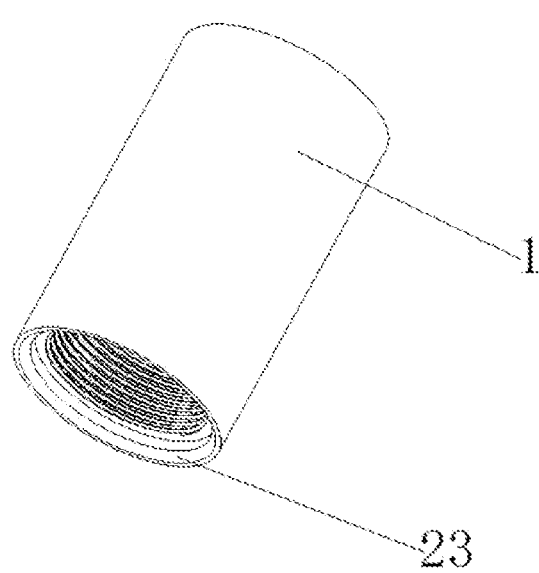
FIG. 8 is a schematic diagram of an upper sleeve of the inserting rod type quick connection device of the present invention.

The technical solutions of the embodiments of the present invention will be described clearly and completely below with reference to the accompanying drawings, and it is to be understood that the described embodiments are merely part of the embodiments of the present invention, but not all embodiments. All other embodiments which can be obtained by a person skilled in the art on the basis of the embodiments of the present invention without any inventive effort, fall within the scope of the present invention.

The present invention will be described below in further detail by way of specific embodiments, taken in conjunction with the accompanying drawings.

An inserting rod type quick connection device comprises an upper sleeve 1 and a lower sleeve 2 with an opening at one end, the upper sleeve 1 is internally provided with an inserting rod piece 3 extending out of the opening, the open end of the lower sleeve 2 is provided with a detachable extrusion sleeve 4, the extrusion sleeve 4 is provided with a plurality of extrusion gaskets 5, four extrusion gaskets 5 are fitted and connected to form a hollow conical cylinder 6 structure. The conical cylinder 6 comprises an outer conical surface 7, an inner conical surface 8, an upper end surface 9 and a lower end surface 10, wherein the upper end surface 9 faces the opening of the lower sleeve 2, the lower end surface 10 faces the inner part of the lower sleeve 2, the outer conical surface 7 is attached to the inner wall of the extrusion sleeve 4, the outer conical surface 7 of the conical cylinder 6 is provided with a spiral groove 11, the spiral groove 11 is sleeved with a conical spring 12, and the outer diameter and the inner diameter of the conical cylinder 6 are gradually decreased from the lower end surface 10 to the upper end surface 9. The inserting rod piece 3 is integrally formed, and comprises an inserting rod 13 and a fixing portion 14. The fixing portion 14 is detachably connected with the inner wall of the upper sleeve 1, the root portion of the inserting rod 13 is connected with the fixing portion 14, the head portion of the inserting rod 13 extends out of the opening of the upper sleeve 1, the inserting rod 13 is conical, and the taper of the inserting rod 13 is the same as that of the inner conical surface 8 of the conical cylinder 6; and when the connection is completed, the head portion of the inserting rod 13 passes through the conical cylinder 6, and the inner surfaces of the extrusion gaskets 5 are fitted with the surface of the inserting rod 13.

The inner diameter of the upper end surface 9 of the hollow conical cylinder 6 formed by the fitting connection of four extrusion gaskets 5 is d, the maximum diameter of the inserting rod 13 is larger than d, and the minimum diameter of the inserting rod 13 is smaller than or equal to d.

The inner wall of the extrusion sleeve 4 is further provided with a dovetail groove 15, and the surface of the extrusion gaskets 5 is provided with a boss 16 corresponding to the dovetail groove 15, so that the extrusion gaskets 5 are slidable along the dovetail groove 15.

Figure 9:
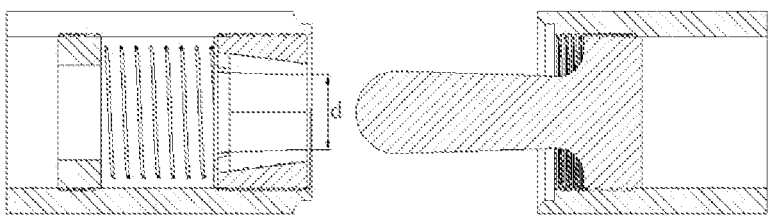
FIG. 9 is a schematic diagram of the inserting rod type quick connection device of the present invention before installation.
Figure 10:
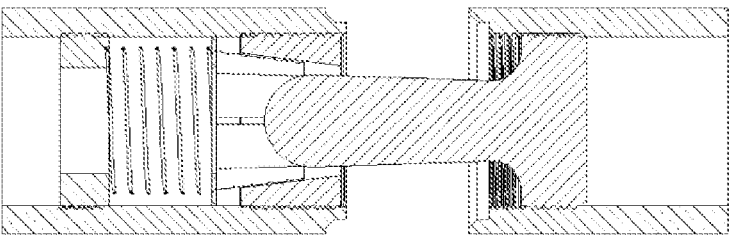
FIG. 10 is a schematic diagram of the inserting rod type quick connection device of the present invention in the installation.
Figure 11:
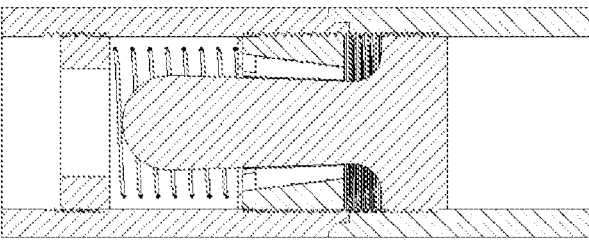
FIG. 11 is a schematic illustration of the inserting rod type quick connection device of the present invention after installation.

The upper sleeve 1 and the lower sleeve 2 are respectively connected with two ends of each steel bar of the prefabricated member steel bar cage. In the embodiment, the connection mode of the upper sleeve 1 and the lower sleeve 2 with the steel bar adopts the common steel bar pier head connection in the prior art, then the concrete prefabricated member is prepared by pouring; and after the concrete prefabricated member is poured, the inserting rod 13 is installed on the upper sleeve 1, the conical spring 12 is sleeved on the extrusion gaskets 5 and installed in the extrusion sleeve 4, and then the extrusion sleeve 4 is installed on the lower sleeve 2; When the concrete prefabricated member is connected, the side of the concrete prefabricated member which is installed with the upper sleeve 1 is installed towards the side of the other concrete prefabricated member, which is installed with the lower sleeve 2, installing one side of the upper sleeve 1 for installing the concrete precast member to one side of the lower sleeve 2 for installing the other precast member, and the inserting rod 13 is inserted into the conical cylinder 6. Because the diameter of the head portion of the inserting rod 13 is larger than the inner diameter d of the upper end surface 9 of the hollow conical cylinder 6 formed by the fitting connection of the four extrusion gaskets 5, as shown in FIG. 9. The inserting rod 13 will produce a pushing force to the extrusion gaskets 5 forming the conical cylinder 6 towards the inner part of the lower sleeve 2, forcing the extrusion gaskets 5 to slide only along the dovetail groove 15 due to the presence of the dovetail groove 15. The four extrusion gaskets 5 are no longer tightly joint to each other, a gap is generated in the conical cylinder 6 enclosed by extrusion gaskets 5, the inner diameter of the upper end surface 9 is gradually increased, and the conical spring 12 is spread by four extrusion gaskets 5. When the inner diameter of the upper end surface 9 is increased to be equal to the maximum diameter of the inserting rod 13, the extrusion gaskets 5 are no longer moved along the dovetail groove 15 towards the inner part of the lower sleeve 2 by the tightening of the conical spring 12. When the maximum diameter of the inserting rod 13 passes through the upper end surface 9 and continues to go deep into the lower sleeve 2, as shown in FIG. 10, the four extrusion gaskets 5 begin to slide along the dovetail groove 15 towards the opening direction of the lower sleeve 2 under the action of the conical spring 12. Because the taper of the inserting rod 13 is equal to the taper of the conical cylinder 6, the inner surfaces of the extrusion gaskets 5 are always fitted with the inserting rod 13 without obstructing the sliding of the extrusion gaskets 5. Since the minimum diameter of the inserting rod 13 is smaller than or equal to d, the extrusion gaskets 5 can be restored to the state of being jointed to form the conical cylinder, as shown in FIG. 11, at this time, the opening of the upper sleeve 1 and the opening of the lower sleeve 2 are jointed, the whole concrete prefabricated member is connected. When pulling force is applied between the upper sleeve 1 and the lower sleeve 2, the inserting rod 13 generates an axial pushing force on the inner conical surface 8, however the extrusion gaskets 5 are connected and cannot move outwards, the conical cylinder 6 generates a pushing force on the extrusion sleeve 4 through the outer conical surface 7, and the extrusion sleeve 4 is connected with the lower sleeve 2, so a reverse pushing force on the extrusion sleeve 4 is generated, and the extrusion gaskets 5 are forced to hold-on the inserting rod 13 more strongly.

The conical spring 12 is used for connecting four extrusion gaskets 5, on the one hand, the four extrusion gaskets 5 are prevented from being dispersed in the assembling process, on the other hand, the axial relative movement among the four extrusion gaskets 5 is restricted. The spiral groove 11 is provided for mounting the conical spring 12, preventing the conical spring 12 from leaving the extrusion gaskets 5. During the installation, firstly splicing the four extrusion gaskets 5, then placing the conical spring 12 in the spiral groove 11, stretching the extrusion gaskets 5 along the axial direction and placing the extrusion gaskets 5 into the extrusion sleeve 4 along the dovetail groove 15, after the installation is completed, the four extrusion gaskets 5 are kept in the state of being fitted and connected to form the conical cylinder 6 under the action of the spring.

The depth of the spiral groove 11 is larger than or equal to the diameter of the cross section of the conical spring 12, so that the sliding between the conical spring 12 and the extrusion gaskets 5 is prevented, and the conical spring 12 can be prevented from protruding out of the outer conical surface 7 to affect the assembly of the extrusion gaskets 5.

The pitch of the spiral groove 11 is equal to the pitch of the conical spring 12 in a natural state, so that the conical spring 12 is prevented from being in a stretching state for a long time, and the service life of the conical spring 12 is prevented from being shortened.

One end of the spiral groove 11 runs through the upper end surface 9 of the hollow conical cylinder 6 formed by the fitting connection of the four extrusion gaskets 5, which ensures a tighter assembly between the conical spring 12 and the extrusion gaskets 5. The outer surface of the corresponding extrusion gasket 5at the other end of the spiral groove 11 is provided with a welding fluid groove 17, the welding fluid groove 17 fix the end of the conical spring 12 and the corresponding extrusion gasket 5 by spot welding, so that the conical spring 12 and the extrusion gaskets 5 are reinforced, and the conical spring 12 is prevented from loosening and falling off.

In the embodiment, the fixing portion 14 is in threaded connection with the inner wall of the upper sleeve 1, and the extrusion sleeve 4 is in threaded connection with the lower sleeve 2. The difficulty of the assembly work can be reduced by adopting the threaded connection.

The head portion of the inserting rod 13 is hemispherical, the diameter of the hemisphere is the same as the maximum diameter of the inserting rod 13, the contact area between the inserting rod 13 and the extrusion gaskets 5 is effectively reduced by the hemispherical head portion. It is favorable for the head portion of the inserting rod 13 to insert quickly, and the assembly difficulty is reduced.

A spring member 18 is provided in the lower sleeve 2. The spring member 18 comprises a retaining ring 19, a spring 20, and a thrust ring 21, one end of the spring 20 is connected with the retaining ring 19, the other end of the spring is connected with the thrust ring 21. The retaining 19 is in threaded connection with the inner wall of the lower sleeve 2, and the thrust ring 21 abuts against the end surface of the extrusion sleeve 4, the extrusion gaskets 5 move along the dovetail groove 15 when the insertion rod 13 is inserted, the thrust ring 21 is extruded by the lower end surface of the extrusion gaskets 5, the thrust ring 21 can provide additional thrust in the axial direction towards the opening direction of the lower sleeve 2 under the action of the spring 20, which will assist the extrusion gaskets 5 to keep stable and rapidly reset.

The opening of the lower sleeve 2 is provided with an embedded ring edge 22, and the opening of the upper sleeve 1 is provided with an embedded ring groove 23 for embedding the embedded ring edge 22. When the upper sleeve 1 is connected and fitted with the lower sleeve 2, the embedded ring edge 22 is embedded into the embedded ring groove 23, so that the bending resistance of the whole connection device can be effectively improved.

In addition, in order to improve the portability of the extrusion sleeve 4 when being mounted to the lower sleeve 2, the end surface of the extrusion sleeve 4 is also provided with four stress hole grooves 24, and the extrusion sleeve 4 is screwed by matching the stress hole grooves 24 with corresponding tools, so that the installation convenience is effectively improved.

Finally, it should be noted that the above embodiments are merely illustrative of the technical solution of the present invention and are not intended to be limiting. While the present invention has been described in detail with reference to the foregoing embodiments, it will be appreciated by those skilled in the art that modifications may be made to the embodiments described above, or equivalents may be substituted for some or all of the features thereof; and the modifications or substitutions do not depart from the nature of the corresponding technical solutions of the embodiments of the present invention.

The invention claimed is:

1. An inserting rod type quick connection device, comprising:

an upper sleeve with an opening at one end and internally provided with an inserting rod piece extending out of the opening, and a lower sleeve with an opening at one end, and the end with the opening of the lower sleeve is provided with a detachable extrusion sleeve provided with a plurality of extrusion gaskets, wherein the plurality of extrusion gaskets are fitted and connected to form a hollow conical cylinder with an outer conical surface, an inner conical surface, an upper end surface and a lower end surface, wherein the outer conical surface is fitted with an inner wall of the extrusion sleeve, the outer conical surface of the conical cylinder is provided with a spiral groove, the spiral groove is sleeved with a conical spring connected to the plurality of extrusion gaskets, and an outer diameter and inner diameter of the conical cylinder are gradually decreased from the lower end surface to the upper end surface; and the inserting rod piece is integrally formed and comprises an inserting rod and a fixing portion detachably connected with an inner wall of the upper sleeve, wherein a root portion of the inserting rod is connected with the fixing portion and a head portion of the inserting rod extends out of the opening of the upper sleeve, wherein the inserting rod is conical and a taper of the inserting rod is the same as that of the inner conical surface of the conical cylinder; and when the connection is completed, the head portion of the inserting rod passes through the conical cylinder and inner surfaces of the extrusion gaskets are fitted with a surface of the inserting rod.

2. The inserting rod type quick connection device of claim 1, wherein the inner diameter of the upper end surface of the hollow conical cylinder formed by the plurality of extrusion gaskets fitted and connected is d, a maximum diameter of the inserting rod is larger than d, and a minimum diameter of the inserting rod is smaller than or equal to d.

3. The inserting rod type quick connection device of claim 2, wherein the inner wall of the extrusion sleeve is further provided with a dovetail groove and a surface of the extrusion gaskets is provided with a boss cooperated with the dovetail groove, so that the extrusion gaskets are slidable along the dovetail groove.

4. The inserting rod type quick connection device of claim 3, wherein a depth of the spiral groove is greater than or equal to a diameter of a cross section of the conical spring.

5. The inserting rod type quick connection device of claim 3, wherein a pitch of the spiral groove is equal to a pitch of the conical spring in a natural state.

6. The inserting rod type quick connection device of claim 3, wherein one end of the spiral groove runs through the upper end surface of the hollow conical cylinder formed by the plurality of extrusion gaskets fitted and connected, and an outer surface of the corresponding extrusion gasket at other end of the spiral groove is provided with a welding fluid groove for fixing an end of the conical spring and the corresponding extrusion gasket by spot welding.

7. The inserting rod type quick connection device of claim 3, wherein the fixing portion is in threaded connection with the inner wall of the upper sleeve, and the extrusion sleeve is in threaded connection with the lower sleeve.

8. The inserting rod type quick connection device of claim 3, wherein the head portion of the inserting rod has a hemispherical shape.

9. The inserting rod type quick connection device of claim 3, wherein a spring member is provided in the lower sleeve, and the spring member comprises a retaining ring, a spring and a thrust ring, wherein one end of the spring is connected with the retaining ring, the other end of the spring is connected with the thrust ring, the retaining ring is in threaded connection with an inner wall of the lower sleeve, and the thrust ring abuts against an end surface of the extrusion sleeve.

10. The inserting rod type quick connection device of claim 3, wherein the opening of the lower sleeve is provided with an embedded ring edge and the opening of the upper sleeve is provided with an embedded ring groove for embedding the embedded ring edge.

11. The inserting rod type quick connection device of claim 2, wherein a depth of the spiral groove is greater than or equal to a diameter of a cross section of the conical spring.

12. The inserting rod type quick connection device of claim 2, wherein a pitch of the spiral groove is equal to a pitch of the conical spring in a natural state.

13. The inserting rod type quick connection device of claim 2, wherein one end of the spiral groove runs through the upper end surface of the hollow conical cylinder formed by the plurality of extrusion gaskets fitted and connected, and an outer surface of the corresponding extrusion gasket at other end of the spiral groove is provided with a welding fluid groove for fixing an end of the conical spring and the corresponding extrusion gasket by spot welding.

14. The inserting rod type quick connection device of claim 2, wherein the fixing portion is in threaded connection with the inner wall of the upper sleeve, and the extrusion sleeve is in threaded connection with the lower sleeve.

15. The inserting rod type quick connection device of claim 2, wherein the head portion of the inserting rod has a hemispherical shape.

16. The inserting rod type quick connection device of claim 2, wherein a spring member is provided in the lower sleeve, and the spring member comprises a retaining ring, a spring and a thrust ring, wherein one end of the spring is connected with the retaining ring, the other end of the spring is connected with the thrust ring, the retaining ring is in threaded connection with an inner wall of the lower sleeve, and the thrust ring abuts against an end surface of the extrusion sleeve.

17. The inserting rod type quick connection device of claim 2, wherein the opening of the lower sleeve is provided with an embedded ring edge and the opening of the upper sleeve is provided with an embedded ring groove for embedding the embedded ring edge.

18. The inserting rod type quick connection device of claim 1, wherein the fixing portion is in threaded connection with the inner wall of the upper sleeve, and the extrusion sleeve is in threaded connection with the lower sleeve.

19. The inserting rod type quick connection device of claim 1, wherein the head portion of the inserting rod has a hemispherical shape.

20. The inserting rod type quick connection device of claim 1, wherein a spring member is provided in the lower sleeve, and the spring member comprises a retaining ring, a spring and a thrust ring, wherein one end of the spring is connected with the retaining ring, the other end of the spring is connected with the thrust ring, the retaining ring is in threaded connection with an inner wall of the lower sleeve, and the thrust ring abuts against an end surface of the extrusion sleeve.

* * * * *